Oct. 27, 1964

J. J. EACHUS

ELECTRICAL COUNTING APPARATUS INCLUDING SATURABLE MAGNETIC CORES 3,154,671

Filed March 22, 1962

2 Sheets-Sheet 1

INVENTOR.
JOSEPH J. EACHUS

BY Henry L. Hanson
ATTORNEY

Oct. 27, 1964 J. J. EACHUS 3,154,671

ELECTRICAL COUNTING APPARATUS INCLUDING SATURABLE MAGNETIC CORES

Filed March 22, 1962 2 Sheets-Sheet 2

INVENTOR.
JOSEPH J. EACHUS

BY Henry L. Hanson

ATTORNEY 3,154,671

ELECTRICAL COUNTING APPARATUS INCLUDING SATURABLE MAGNETIC CORES

Joseph J. Eachus, Cambridge, Mass., assignor to Honeywell Inc., a corporation of Delaware Filed Mar. 22, 1962, Ser. No. 181,534
9 Claims. (Cl. 235—92)

A general object of the present invention is to provide a new and improved electrical apparatus useful in the manipulation of electrical signals. More specifically, the present invention is concerned with a new and improved type of electronic digital counter apparatus which is characterized by its relative simplicity particularly in the manner in which the logic of the counter is arranged in order to implement the desired counting.

Electrical and electronic counters are widely used in many types of data processing apparatus and in many types of automatic control apparatus. It is important in many applications of electronic counters that the counters be readily implemented in terms of logic and that the resultant counter be reliable and capable of operation over long periods of time with relatively little attention. An electrical element with proven reliability and stability of operating characteristics suitable for use in counters requiring simplicity and reliability is the saturable magnetic core. It has been found, as is more specifically set forth below, that this type of core is readily adapted for use in performing certain logical functions associated with mathematical operations such as digital counting. By uniquely relating a series of cores to an associated electronic register of the data storage type, it is possible to construct a counting circuit using an extremely simple organization of intercoupling circuits between the cores and the associated register circuits.

It is therefore a further more specific object of the present invention to provide a new and improved electronic digital counter apparatus utilizing saturable magnetic cores in a magnetic logic circuit intercoupling a plurality of bistable circuits associated therewith in a storage register.

The preferred storage register used in the present invention takes the form of a series of separate bistable circuits each of which has a separate input which, when activated, is capable of complementing the bistable state of the associated bistable circuit. The complementing input is coupled to a sense winding on an associated magnetic core which is adapted to be switched by a driving signal source whenever the associated core is not saturated. The outputs of the bistable circuits of the register are arranged to be coupled to the magnetic cores so that when the selected outputs are active, they will be saturating any core to which they are coupled. By uniquely relating the output from each bistable circuit of the register to selected ones of the cores associated with the circuits of the register, it is possible to provide a digital counter which will count, for example, in a binary or binary coded decimal manner.

It is therefore a further object of the present invention to provide a new and improved counter circuit which comprises a register having a plurality of bistable circuits each of which is adapted to be complemented by way of a single input and wherein the bistable circuits of the register may be selectively controlled by signals coupled from the saturable magnetic cores whose input logic for saturation purposes is controlled by the bistable circuits of the register.

Still another object of the present invention is to provide a new and improved electrical counter circuitry employing a plurality of saturable magnetic cores arranged so that each core is coupled to one or more complementing inputs of the associated register circuits for providing a binary or a binary coded decimal type counter.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
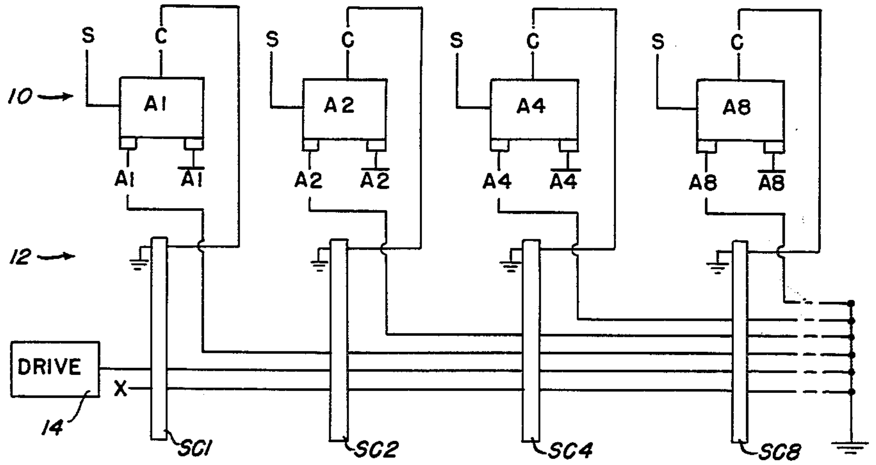
FIGURE 1 is a diagrammatic representation of a preferred form of binary counter.

Referring first to FIGURE 1, the numeral 10 identifies an electronic register shown to comprise four bistable circuits identified as A1, A2, A4 and A8. These bistable circuits are each adapted to be of the type that they be selectively set or reset in accordance with externally applied signals. Further, each of these circuits has a further input C which is intended as a complementing input for the associated circuit. The complementing input serves to change the bistable state of the associated circuit each time a signal is applied thereto. A representative form of bistable circuit that may be used will be found in a co-pending application of the present inventor bearing Serial Number 656,791, filed May 3, 1957, now U.S. Patent No. 3,067,336.

Each of the bistable circuits of the register 10 has an assertion output A and a negation output $\overline{A}$. The assertion and negation outputs are arranged for connection to associated magnetic core circuitry such as the magnetic logical circuit 12.

The magnetic logical circuitry 12 comprises a series of saturable magnetic cores individually identified as SC1, SC2, SC4 and SC8. Each of the saturable scores SC is arranged to have passed therethrough certain control windings in the form of lines that connect, for example, to the outputs of the bistable circuits of the register 10. In the event that these saturable cores SC take the form of hollow cylindrical elements, the windings which are selectively coupled thereto may comprise the simple threading of a wire through the aperture of the core to form a single turn coupling to the core. Also coupled to each of the cores is a sense winding which is capable of sensing when an electrical signal is coupled into the core and the core has the flux changed therein to indicate that it is not saturated. The sense winding on each core is coupled to the respective complementing lines on the inputs of the respective register circuits.

A drive signal source 14 is also coupled to each core of the magnetic logical circuitry 12 and this drive signal source is arranged to provide a signal which tends to cause a flux change in any core that is not saturated. The magnetic logical circuitry 12 also includes a counter suppress line X which may be utilized for purposes of inhibiting the logic or preventing the counter from functioning even though the drive signals from the source 14 are applied to the cores.

Figure 2:
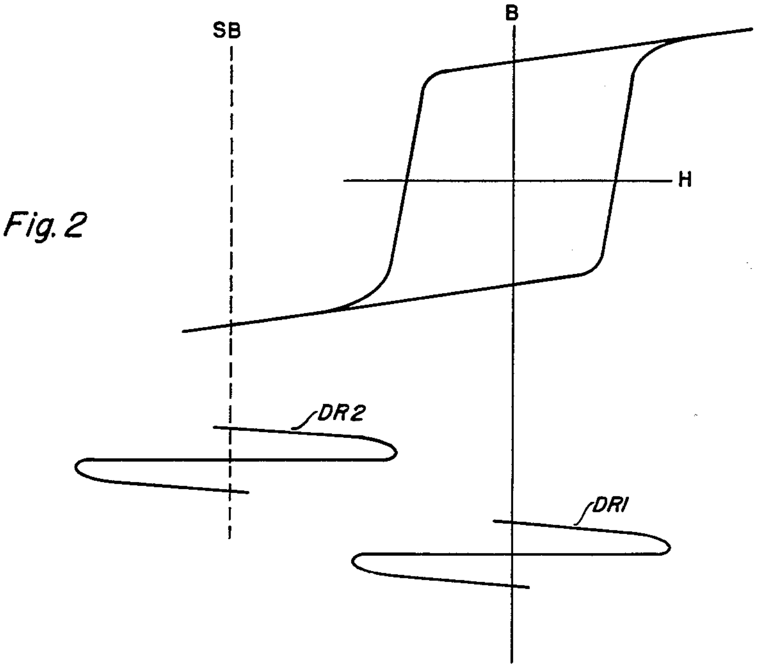
FIGURE 2 illustrates waveforms associated with the operating characteristics of the cores and the driving signals of the circuitry in FIGURE 1.

Before considering the operation of the circuitry of FIGURE 1, reference is made to FIGURE 2. In this figure, the hysteresis characteristic of a preferred type of core used in FIGURE 1 is shown. The hysteresis characteristic may well be of the type referred to as a rectangular hysteresis characteristic with fairly pronounced saturated states. Normally, the hysteresis characteristic will be centered on the B–H coordinates, as shown. Further, in the absence of some external biasing source, the applied drive signal DR1 will cause the core to be switched from one saturated state into the other and back to the neutral point. When the core has been switched in this manner, a signal may be coupled from the core into a sense winding on the core.

In the event that a direct current saturating bias SB is coupled into the associated core, an applied input signal will be operating about the saturated bias line SB. Thus, the signal DR2 which is shown swinging about the bias line SB will not cause any substantial change of flux in the associated core and consequently any signal in a sense winding coupled thereto will be negligible.

Considering next the specific operation of the circuitry of FIGURE 1, it is first assumed that each of the register circuits in the register 10 has been switched into a set-state so that the respective output assertion lines A are active and consequently are producing an output current of sufficient magnitude to saturate any core coupled thereto. Inasmuch as the output assertion line A1 is coupled to the saturable cores SC2, SC4 and SC8, each of these cores will be in a saturated state. Further, it will be noted that the output assertion line A2 is coupled to the saturable cores SC4 and SC8 and applying a saturating current to these cores. The output of the register A4, by way of its assertion line A4, will be applying a saturating current to the core SC8. It is further assumed that the counter suppress signal X is also present and that the current flowing from this signal is sufficient to saturate all of the saturable cores SC of the magnetic logic circuitry 12.

Under the conditions assumed above, the application of a drive signal by way of the drive signal source 14 to the respective saturable cores SC of the magnetic logical circuitry 12 will produce substantially no change in flux in any of the cores coupled thereto and consequently the register circuit 10 will stay in the state that it is first assumed to be in, namely with all of the register circuits in the set state.

When the suppress signal X is removed, the application of the driving signal of the source 14 will be effective to cause a flux change in the saturable core SC1. This change in flux will be detected by the sense winding coupled thereto. The resultant signal in the sense winding will be effective on the complementing input C of the stage A1 so as to change the bistable state of this register circuit to thereby activate the output line $\overline{A1}$ and deactivate the assertion output A1. When this switching occurs, it will be apparent that the saturable core SC1 and the saturable core SC2 will both be free to switch upon the application of the next drive signal. Thus, upon the application of the next drive signal, both of the cores SC1 and SC2 will switch and the bistable circuits A1 and A2 will both be complemented. This means that the bistable circuit A1 will switch back to the set state so that the A1 output is active and the negation output $\overline{A1}$ is inactive. The complementing of the circuit A2 will activate the negation output line $\overline{A2}$ and render inactive the assertion output A2.

It will be noted that when a third drive signal is applied to the magnetic logical circuitry 12, the only saturable core that can switch will be core SC1 due to the fact that the register circuit A1 has been switched back to the set state. With the third drive pulse switching the core at C1, the register circuit A1 will be switched into the reset state so that following the third drive signal, both the register circuits A1 and A2 will be in the reset state. This will mean that the saturating signals will have been removed from each of the cores SC1, SC2 and SC4. The fourth drive signal will then be able to cause a switching in each of these cores so that the corresponding register circuits A1, A2 and A4 will be complemented. The register circuits A1 and A2 will both be switched back into the set state while the register circuit A4 will be switched to the reset state.

It will be apparent from a consideration of the foregoing operation that with the continued application of drive signals from the source 14 the cores and associated register circuits will go through a sequencing operation in a straight forward binary progression. This binary progression may be tabulated in the manner set forth below in Table 1 wherein the application of each drive signal is related to the final setting of the register circuits following each drive signal.

*Table 1*

| | $\overline{A8}$ | $\overline{A4}$ | $\overline{A2}$ | $\overline{A1}$ | Decimal |
|---|---|---|---|---|---|
| | (Result following Drive) | | | | |
| Set (start) | 0 | 0 | 0 | 0 | (0) |
| Dr 1 | 0 | 0 | 0 | 1 | (1) |
| Dr 2 | 0 | 0 | 1 | 0 | (2) |
| Dr 3 | 0 | 0 | 1 | 1 | (3) |
| Dr 4 | 0 | 1 | 0 | 0 | (4) |
| Dr 5 | 0 | 1 | 0 | 1 | (5) |
| Dr 6 | 0 | 1 | 1 | 0 | (6) |
| Dr 7 | 0 | 1 | 1 | 1 | (7) |
| Dr 8 | 1 | 0 | 0 | 0 | (8) |
| Dr 9 | 1 | 0 | 0 | 1 | (9) |
| Dr 10 | 1 | 0 | 1 | 0 | (10) |
| Dr 11 | 1 | 0 | 1 | 1 | (11) |
| Dr 12 | 1 | 1 | 0 | 0 | (12) |
| Dr 13 | 1 | 1 | 0 | 1 | (13) |
| Dr 14 | 1 | 1 | 1 | 0 | (14) |
| Dr 15 | 1 | 1 | 1 | 1 | (15) |

The structure of the binary counter in FIGURE 1 may be represented by way of a series of mathematical expressions which relate to the switching status of the registers which make up the binary counter. These series of expressions for an "*n*" stage binary counter are as follows:

$$DA1=X$$
$$DA2=A1 \cdot X$$
$$DA4=A1 \cdot A2 \cdot X$$
$$DA8=A1 \cdot A2 \cdot A4 \cdot X$$
$$DAn=A1 \cdot A2 \cdot A4 \cdot \cdot \cdot An\text{–}1 \cdot X$$

In the foregoing series of expressions, the term DA refers to the output condition related to when a change of state of the associated A register circuit will occur. Thus, the expression DA1=X means that when the suppress signal X is in what might be referred to as a "permit" state at the time that a drive signal is applied, the register A1 will have a change in state. Thus, the suppress signal X must be inactive and not saturating the core SC1 if the register circuit A1 is to change state. Further, the register A2 will change state when the register A1 is in the reset state so that the signal on the output line A1 is in the "permit" state and the suppress signal X is also in the "permit" state.

It will be apparent that the foregoing series of expressions may also be utilized for purposes of wiring the magnetic core logical circuitry. Thus, it will be apparent that the assertion outputs of the register circuits A must be coupled to all of the saturable cores SC having a higher binary order of significance.

It will be readily apparent that the logical circuitry of the apparatus illustrated in FIGURE 1 will perform a counting function which is in an increasing direction. In order to provide a counter which operates in a decreasing direction, it is necessary to change the interpretation of the output of the register circuits so that instead of considering the negation outputs as set forth above in Table 1, the interpretation may be by way of the assertion outputs in which event the starting position for the register 10 would be of the series of four ones (1111).

Figure 3:
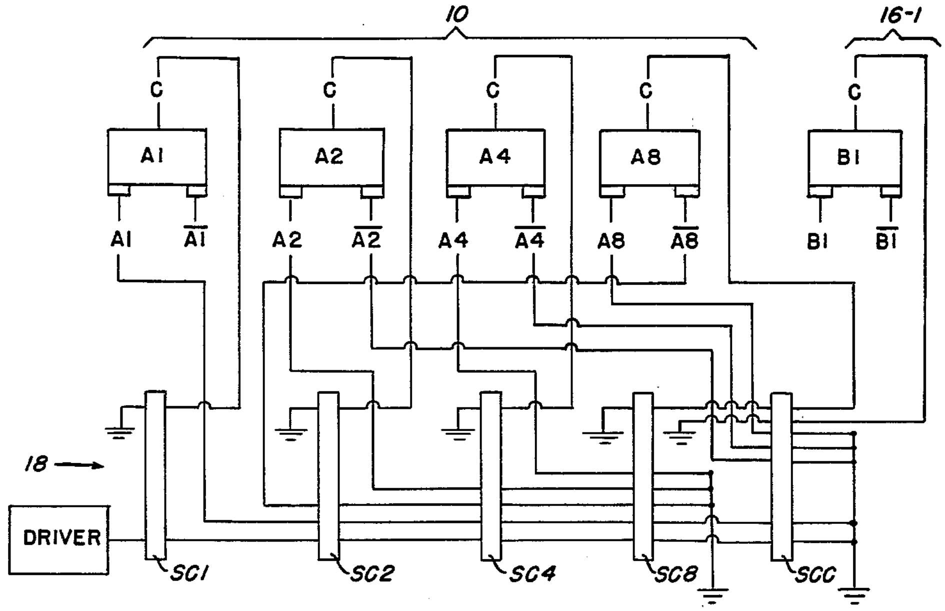
FIGURE 3 is a diagrammatic illustration of binary coded decimal counter circuit.

Referring next to FIGURE 3, there is here illustrated a modified form of counter employing the same basic principles as set forth above with respect to the circuitry of FIGURE 1. In this form of counter, the magnetic logical circuitry has been so arranged that the counting performed is counting in the binary coded decimal mode. Thus, as the counter is advanced in its normal counting sequence, when the counter steps from binary coded decimal 9 to a binary coded decimal 10, there is a resetting of the four low order binary counter stages and a carry into the next higher order counter stage.

Considering FIGURE 3 more specifically, the binary counter is shown with two separate register sections, the first section corresponding to the section 10 in FIGURE 1 and carrying the same reference identification and the further higher order section indicated as such in 16–1.

A revised magnetic core logical circuit has been provided as indicated at 18. This revised logic includes the same basic magnetic cores as described above in connection with FIGURE 1 and a further magnetic core SCC which may be referred to as the carry core.

In considering the wiring of the logic circuits 18 in FIGURE 3, it will be noted that the four low order stages have been coupled to the associated saturable core devices in the same manner as in FIGURE 1. One additional wire is shown coupled to the cores SC2, SC4 and SC8 and that is the negation output line $\overline{A}$ on the register stage A8. This particular line which couples the cores to the negation output of the register circuit A8 provides one of the suppressing signals required for effecting the necessary switching associated with converting a normal binary number into a binary coded decimal number.

The core SCC is arranged to have coupled thereto the negation outputs of the register circuits A2 and A4 and the assertion output of the register output A8. The cores SC8 and SCC are coupled by way of a common sense winding to the complementing input of the register circuit A8. In addition, the core SCC has an additional sense winding coupled to a register circuit B1 in the next higher order register section 16–1.

The general functioning of the apparatus illustrated in FIGURE 3 is the same as that discussed above in connection with FIGURE 1. Thus, as a drive signal is coupled to each of the saturable core devices SC, any core which is not saturated at any particular drive time will cause a signal to be produced in the associated sense winding so that the register circuit coupled thereto will be complemented. The manner in which the sequencing takes place within the cores and the associated register circuits is best illustrated by Table 2 following.

*Table 2*

| | $\overline{B1}$ | $\overline{A8}$ | $\overline{A4}$ | $\overline{A2}$ | $\overline{A1}$ | Decimal |
|---|---|---|---|---|---|---|
| | (Result Following Drive) | | | | | |
| Set (start) | 0 | 0 | 0 | 0 | 0 | (0) |
| Dr 1 | 0 | 0 | 0 | 0 | 1 | (1) |
| Dr 2 | 0 | 0 | 0 | 1 | 0 | (2) |
| Dr 3 | 0 | 0 | 0 | 1 | 1 | (3) |
| Dr 4 | 0 | 0 | 1 | 0 | 0 | (4) |
| Dr 5 | 0 | 0 | 1 | 0 | 1 | (5) |
| Dr 6 | 0 | 0 | 1 | 1 | 0 | (6) |
| Dr 7 | 0 | 0 | 1 | 1 | 1 | (7) |
| Dr 8 | 0 | 1 | 0 | 0 | 0 | (8) |
| Dr 9 | 0 | 1 | 0 | 0 | 1 | (9) |
| Dr 10 | 1 | 0 | 0 | 0 | 0 | (10) |
| Dr 11 | 1 | 0 | 0 | 0 | 1 | (11) |
| Dr 12 | 1 | 0 | 0 | 1 | 0 | (12) |
| Dr 13 | 1 | 0 | 0 | 1 | 1 | (13) |
| Dr 14 | 1 | 0 | 1 | 0 | 0 | (14) |
| Dr 15 | 1 | 0 | 1 | 0 | 1 | (15) |

It will be noted from an examination of Table 2 that the counting operation in the initial zero set state through the first nine drive signals corresponds to the same operation set forth above in Table 1.

Upon the occurrence of the drive signal DR10, it will be noted that the register circuit A8 will be complemented, the register circuit A1 will be complemented so that within the register section 10, all register circuits will have been switched into the set-state. Further, due to the lack of a saturating signal in the carry core SCC at the same that the drive signal 10 is applied, this core will switch to provide a signal for stage B1 in the second register section 16–1. Once this switching operation has taken place, the sequencing in the low order stages of section 10 will continue in the ordinary order of binary progression until the progression has been advanced to a binary coded decimal 19. At that time, the register stages and the associated logical circuitry will be such that following the 20th drive signal, all of the register circuits shown in FIGURE 3 will be in a set state and a carry would normally be propagated to the next higher order stage in the register 16–1.

Figure 4:
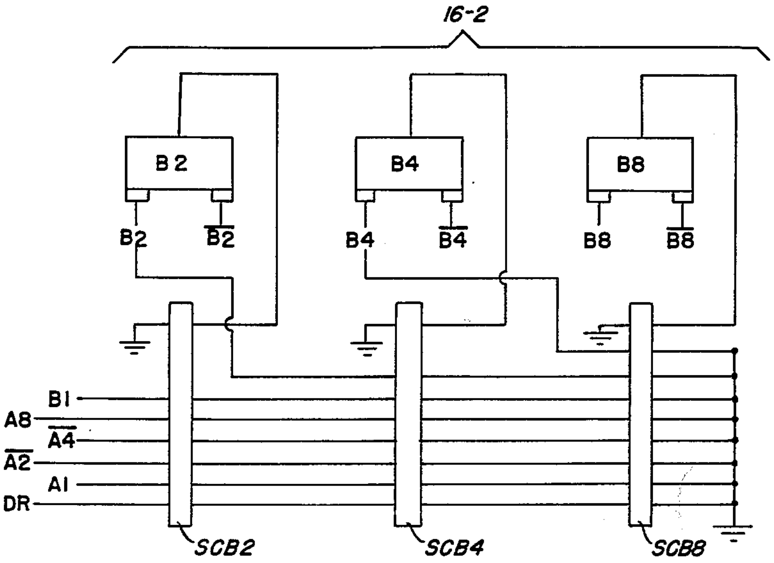
FIGURE 4 is a diagrammatic illustration of further stages which may be associated with the binary coded decimal counter of FIGURE 3.

The carry-into to the next higher order stage may be into a circuit such as illustrated in FIGURE 4 which may be considered to comprise three stages constituting a register section 16–2. This circuitry will be seen to comprise three additional bistable circuits identified as B2, B4 and B8. These register circuits are associated with three additional saturable magnetic cores SCB2, SCB4 and SCB8. Each of the respective cores has a sense winding coupled to the associated complementing input of the bistable circuits of the register section 16–2. The output of the register circuits is coupled to the associated saturable cores SCB in the manner described above in connection with FIGURE 1, namely the assertion outputs are coupled to any saturable core device of higher order binary significance.

It will be noted that there are also signals provided from the register circuits A from FIGURE 3. The signals provided are the signals A8, $\overline{A4}$, $\overline{A2}$ and A1 and control the advancing of any counting operation in the circuitry of FIGURE 4 so that it relates to a normal binary coded decimal carry from the low order section 10 of FIGURE 3. This counting in the circuitry illustrated will be in the ordinary order of binary significance except that it will relate to a binary coded decimal order of significance which is greater in accordance with the next higher order of decimal significance. Obviously, the circuitry of FIGURE 4 may be extended to include an additional core which will provide for a binary coded decimal conversion to take place at the time that the circuit has counted to 9 in the stages B1, B2, B4 and B8. It will also be apparent that further stages or register sections may be provided for counting higher in a binary coded decimal sense similar to that described herein. The logical circuitry should be arranged so that the counting will be controlled in the higher order register sections to insure that the counting will not take place except when there is a carry from the next lower order section into the next higher order section.

As with the circuitry described above in connection with FIGURE 1, the logic for the circuitry of FIGURE 3 may be expressed in terms of a series of mathematical statements as follows:

$$DA1=1$$
$$DA2=A1\cdot\overline{A8}$$
$$DA4=A1\cdot A2\cdot\overline{A8}$$
$$DA8=A1\cdot A2\cdot A4\cdot\overline{A8}+A8\cdot\overline{A4}\cdot A2\cdot\overline{A1}$$
$$DB1=A8\cdot\overline{A4}\,\overline{A2}\cdot A1$$

As described above, the series of mathematical statements may also be utilized for purposes of determining the manner in which the register circuits are associated with the saturating windings on the associated saturable cores of the magnetic logical circuitry. Thus, the register circuit A8 will have a change in state when the output signals A1, A2, A4 and A8 are all in the "permit" state or are not saturating the core SC8. Further, the register circuit A8 will have a change in state if the output signals A8, $\overline{A4}$, $\overline{A2}$ and A1 are all in the "permit" stage or are not saturating the core SCC.

It will be apparent from considering the foregoing described apparatus that there has been provided a new and improved counter circuitry which is extremely simple in its operational concepts and yet encompasses a minimum of logical circuitry. Further, the logical circuitry has been implemented using components having extremely reliable characteristics. In addition, the circuitry is readily adapted for counting both in the binary mode as well as in the binary coded decimal mode.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. A binary counter apparatus comprising a plurality of saturable magnetic cores, a corresponding plurality of bistable control circuits each of which has an output which when active is in itself of a magnitude sufficient to saturate any one of said cores coupled thereto, each of said bistable control circuits further comprising a set input and a complementing input, means coupling a sense winding on each of said cores to the complementing input of the corresponding control circuit, means coupling the output of a first of said control circuits to all except the first of said plurality of cores, means coupling the output of a second one of said control circuits to all except the first and second of said plurality of cores, and means coupled to each core to switch any core which is not saturated thereby coupling a signal to the sense winding associated therewith.

2. A binary counter apparatus comprising a plurality of saturable magnetic cores, a corresponding plurality of bistable control circuits each of which represents a binary digit and further has an output which when active is in itself of a magnitude sufficient to saturate any one of said cores coupled thereto, each of said bistable control circuits further comprising a set input and a complementing input, means coupling a sense winding on each of said cores to the complementing input of the corresponding bistable control circuit, means coupling the output of the control circuit representing the lowest value of binary digit to all of said plurality of cores that are coupled by sense windings to control circuits representing higher values of binary digits, means coupling the output of a second one of said control circuits to all of said plurality of cores except the cores having sense windings coupled to said first and second control circuits, and means coupled to each core to switch any core which is not saturated thereby coupling a signal to the sense winding associated therewith.

3. A binary counter comprising a plurality of saturable magnetic cores, a corresponding plurality of bistable control circuits each of which has an output which when active is in itself of a magnitude sufficient to saturate any one of said cores coupled thereto, each of said bistable control circuits further comprising a set input and a complementing input, means coupling a sense winding on each of said cores to the complementary input of the corresponding control circuit, means coupling the output of a first of said control circuits to all except the first of said plurality of cores, means coupling the output of a second one of said control circuits to all except the first and second of said plurality of cores, and a single drive pulse producing means coupled to all of said cores to switch any core which is not saturated thereby coupling a signal to the sense winding associated therewith.

4. An $n$-stage binary counter comprising $n$ saturable magnetic cores being arranged in a predetermined binary order, $n$ bistable switching circuits associated one each with each of said $n$ cores, each of said switching circuits having a complementing input which when activated is adapted to switch the bistable state of the switching circuit, $n$ sense winding associated one each with each of said $n$ cores and the complementing input of the associated of said $n$ circuits, each of said switching circuits further having an output which is activated when the associated circuit is in a first bistable state, means coupling said outputs of each of said $n$ switching circuits to said $n$ cores so that the output of the lowest order of the circuits will be coupled to all of the $n$ cores of the counter having a binary order greater than the lowest order and each output of each circuit of higher order will be coupled to the cores of all higher order ones of said $n$ cores, and means coupled to said cores to cause any core that is not saturated to switch and couple a signal to the sense winding coupled thereto to thereby switch the bistable state of the associated switching circuit.

5. A binary coded decimal counter comprising a first saturable magnetic core, a first bistable switching circuit having an input, when activated, for changing the bistable state of said first circuit and an output whose magnitude is sufficient to saturate a magnetic core coupled thereto, a first sense winding coupled between said first core and said input of said first switching circuit, a second saturable magnetic core, a second bistable switching circuit having an input, when activated, for changing the bistable state of said second circuit and an output whose magnitude is sufficient to saturate a magnetic core coupled thereto, a second sense winding coupled between said second core and said input of said second switching circuit, a third saturable magnetic core, a third bistable switching circuit having an input, when activated, for changing the bistable state of said third circuit and an output whose magnitude is sufficient to saturate a magnetic core coupled thereto, a third sense winding coupled between said third core and said input of said third switching circuit, a fourth saturable magnetic core, a fourth bistable switching circuit having an input, when activated, for changing the bistable state of said fourth circuit and an output whose magnitude is sufficient to saturate a magnetic core coupled thereto, a fifth saturable magnetic core, a fourth sense winding coupled between said fourth and fifth magnetic cores and said input of said fourth switching circuit, a fifth bistable switching circuit having an input, when activated, for changing the bistable state of said fifth circuit and an output whose magnitude is sufficient to saturate a magnetic core coupled thereto, a fifth sense winding coupled between said fifth magnetic core and the input of said fifth switching circuit, a sixth saturable magnetic core, a sixth bistable switching circuit having an input, when activated, for changing the bistable state of said sixth switching circuit, a sixth sense winding coupled between said sixth magnetic core and said sixth switching circuit, means coupling an output of said first switching circuit to said second, third, fourth, fifth and sixth magnetic cores, means coupling an output of said second switching circuit to said third and fourth magnetic cores, means coupling an output of said third switching circuit to said fourth magnetic core, means coupling an output of said fourth switching circuit to said fifth and sixth magnetic cores, means connecting a further output of each of said second and third switching circuits to said fifth and sixth magnetic cores, means coupling a further output of said fourth switching circuit to said second, third and fourth magnetic cores, and a magnetic core driving means coupled to all of said magnetic cores to switch any core which is not saturated.

6. An $n$-stage binary counter comprising $n$ saturable magnetic cores being arranged in a predetermined binary order, $n$ bistable switching circuits associated one each with each of said $n$ cores, each of said switching circuits having a complementing input which when activated is adapted to switch the bistable state of the associated switching circuit, $n$ sense windings associated one each with each of said $n$ cores and the complementing input of the associated one of said $n$ circuits, each of said switching circuits further having an output which is activated when the associated circuit is in a first bistable state, means coupling said outputs of each of said $n$ switching circuits to said $n$ cores so that the output of the lowest order of the circuits will be coupled to all of the $n$ cores of the counter having a binary order greater than the lowest order and each output of each circuit of higher order will be coupled to the cores of all higher order ones of said $n$ cores, a counter holding means coupled to all $n$ cores of said counter and adapted when active to saturate all of said cores, and driving means coupled to all of said cores to cause any core that is not saturated to switch and couple a signal to the sense winding coupled thereto to thereby switch the bistable state of the associated switching circuit.

7. A binary coded decimal counter comprising a first saturable magnetic core, a first bistable switching circuit having an input, when activated, for changing the bistable state of said first circuit and an output whose magnitude is sufficient to saturate a magnetic core coupled thereto, a first sense winding coupled between said first core and said input of said first switching circuit, a second saturable magnetic core, a second bistable switching circuit having an input, when activated, for changing the bistable state of said second circuit and an output whose magnitude is sufficient to saturate a magnetic core coupled thereto, a second sense winding coupled between said second core and said input of said second switching circuit, a third saturable magnetic core, a third bistable switching circuit having an input, when activated, for changing the bistable state of said third circuit and an output whose magnitude is sufficient to saturate a magnetic core coupled thereto, a third sense winding coupled between said third core and said input of said third switching circuit, a fourth saturable magnetic core, a fourth bistable switching circuit having an input, when activated, for changing the bistable state of said fourth circuit and an output whose magnitude is sufficient to saturate a magnetic core coupled thereto, a fifth saturable magnetic core, a fourth sense winding coupled between said fourth and fifth magntic cores and said input of said fourth switching circuit, means coupling an output of said first switching circuit to said second, third, fourth and fifth magnetic cores, means coupling an output of said second switching circuit to said third and fourth magnetic cores, means coupling an output of said third switching circuit to said fourth magnetic core, means coupling an output of said fourth switching circuit to said fifth magnetic core, means connecting a further output of each of said second switching circuit and said third switching circuit to said fifth magnetic core, means coupling a further output of said fourth switching circuit to said second, third and fourth magnetic cores, and a magnetic core driving means coupled to all of said magnetic cores to switch any core which is not saturated.

8. A binary counter comprising a first saturable magnetic core, a first bistable switching circuit having an input, when activated, for changing the bistable state of said first circuit and an output whose magnitude is sufficient to saturate a magnetic core coupled thereto, a first sense winding coupled between said first core and said input of said first switching circuit, a second saturable magnetic core, a second bistable switching circuit having an input, when activated, for changing the bistable state of said second circuit and an output whose magnitude is sufficient to saturate a magnetic core coupled thereto, a second sense winding coupled between said second core and said input of said second switching circuit, a third saturable magnetic core, a third bistable switching circuit having an input, when activated, for changing the bistable state of said third circuit and an output whose magnitude is sufficient to saturate a magnetic core coupled thereto, a third sense winding coupled between said third core and said input of said third switching circuit, a fourth saturable magnetic core, a fourth bistable switching circuit having an input when activated for changing the bistable state of said fourth circuit and an output whose magnitude is sufficient to saturate a magnetic core coupled thereto, a fourth sense winding coupled between said fourth magnetic core and said input of said fourth switching circuit, means coupling an output of said first switching circuit to said second, third, and fourth magnetic cores, means coupling an output of said second switching circuit to said third and fourth magnetic cores, means coupling an output of said third switching circuit to said fourth magnetic core, and a magnetic core driving means coupled to all of said magnetic cores to switch any core which is not saturated thereby coupling a signal to the sense winding associated therewith.

9. A binary coded decimal counter comprising a first saturable magnetic core, a first bistable switching circuit having an input, when activated, for changing the bistable state of said first circuit and an output whose magnitude is in itself sufficient to saturate a magnetic core coupled thereto, a first sense winding coupled between said first core and said input of said first switching circuit, a second saturable magnetic core, a second bistable switching circuit having an input, when activated, for changing the bistable state of said second circuit and an output whose magnitude is sufficient to saturate a magnetic core coupled thereto, a second sense winding coupled between said second core and said input of said second switching circuit, means coupling an output of said first switching circuit to said second magnetic core, and a magnetic core driving means coupled to both of said magnetic cores to switch any core which is not saturated thereby coupling a signal to the sense winding associated therewith.

References Cited in the file of this patent

UNITED STATES PATENTS

| | | |
|---|---|---|
| 2,794,130 | Newhouse et al. | May 28, 1957 |
| 3,014,656 | O'Brien | Dec. 26, 1961 |

FOREIGN PATENTS

| | | |
|---|---|---|
| 721,669 | Great Britain | Jan. 12, 1955 |

OTHER REFERENCES

Arithmetic Operations in Digital Computers, by Richards, D. Van Nostrand Co., Inc., N.Y., 1955, chapt. 7, pp. 193–208 (Figs. 7–3, page 195, Figs 6–10, p. 203), TK 7888.3 R5 C–3.